United States Patent
Yu et al.

(10) Patent No.: US 12,499,952 B2
(45) Date of Patent: Dec. 16, 2025

(54) POWER MANAGEMENT ASSOCIATED WITH MEMORY AND CONTROLLER

(71) Applicant: Micron Technology, Inc., Boise, ID (US)

(72) Inventors: Liang Yu, Boise, ID (US); Jonathan S. Parry, Boise, ID (US); Tal Sharifie, Lehavim (IL)

(73) Assignee: Micron Technology, Inc., Boise, ID (US)

( * ) Notice: Subject to any disclaimer, the term of this patent is extended or adjusted under 35 U.S.C. 154(b) by 91 days.

(21) Appl. No.: 18/444,448

(22) Filed: Feb. 16, 2024

(65) Prior Publication Data

US 2024/0290396 A1   Aug. 29, 2024

Related U.S. Application Data

(60) Provisional application No. 63/447,846, filed on Feb. 23, 2023.

(51) Int. Cl.
*G11C 16/30* (2006.01)
*G06F 12/02* (2006.01)

(52) U.S. Cl.
CPC .......... *G11C 16/30* (2013.01); *G06F 12/0246* (2013.01)

(58) Field of Classification Search
CPC ........................... G11C 16/30; G06F 12/0246
See application file for complete search history.

(56) References Cited

U.S. PATENT DOCUMENTS

| | | | |
|---|---|---|---|
| 2015/0185813 A1* | 7/2015 | Ping | G06F 1/3268 713/323 |
| 2019/0065086 A1* | 2/2019 | Margetts | G06F 13/1668 |
| 2019/0140666 A1* | 5/2019 | Lee | H03M 13/6325 |
| 2021/0064114 A1* | 3/2021 | Troia | G11C 11/409 |

\* cited by examiner

*Primary Examiner* — Larry T Mackall
(74) *Attorney, Agent, or Firm* — Holland & Hart LLP

(57) ABSTRACT

Methods, systems, and devices for power management associated with memory and a controller are described. A memory system performs a power management operation that accounts for power usage by any combination of application specific integrated circuits (ASICs) and memory arrays. The power management operation includes multiple logical unit numbers (LUNs) assigned to a single ASIC, which increases a quantity of bits for communicating a power usage. An ASIC included in a memory system may utilize twice as many bits for communicating power usage information when compared to a NAND array. As part of the power management operation, an ASIC may transmit, to a controller, a first set of bits indicating a power usage of the ASIC, a first subset of the set of bits transmitted during a first instance of a token ring and a second subset of the set of bits transmitted during a second instance of the token ring.

20 Claims, 5 Drawing Sheets

POWER MANAGEMENT ASSOCIATED WITH MEMORY AND CONTROLLER

CROSS REFERENCE

The present application for patent claims priority to U.S. Patent Application No. 63/447,846 by Yu et al., entitled "POWER MANAGEMENT ASSOCIATED WITH MEMORY AND CONTROLLER," filed Feb. 23, 2023, which is assigned to the assignee hereof, and which is expressly incorporated by reference herein.

TECHNICAL FIELD

The following relates to one or more systems for memory, including power management associated with memory and a controller.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states if disconnected from an external power source.

DETAILED DESCRIPTION

Figure 1:
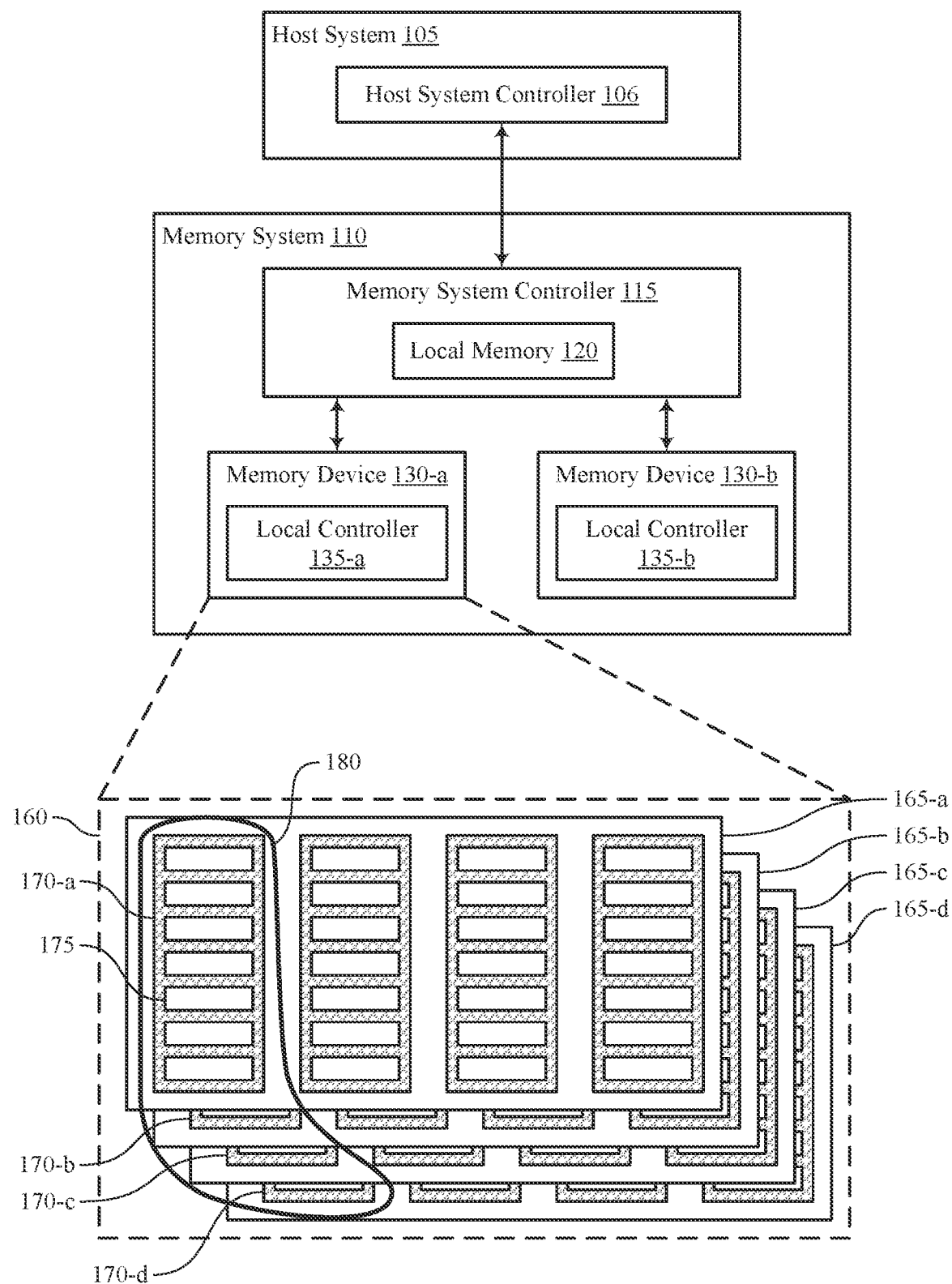
FIG. 1 illustrates an example of a system that supports power management associated with memory and a controller in accordance with examples as disclosed herein.

Some memory systems may include one or more circuits, such as application specific integrated circuits (ASICs), which may be configured to perform specific applications or tasks for the memory system. For example, the ASIC may interface with (e.g., communicate with) or otherwise manage communications (e.g., manage data) for one or more memory arrays of the memory system (e.g., one or more not-and (NAND) arrays). In some cases, various components of the memory system (e.g., NAND arrays, ASICs) may be assigned respective logical unit numbers (LUNs). The LUNs may include or be an identifier for a logical unit of NAND memory within a memory system (e.g., a set of NAND arrays managed as a single entity, a portion of a NAND array), among other examples. Additionally, or alternatively, a LUN may include or be an identifier for an ASIC.

In some cases, a memory system may perform a power management operation (e.g., a programmable peak power management (pPPM) operation) to track power usage for a given quantity of LUNs. To perform the power management operation, a controller of the memory system may receive power usage information (e.g., a quantity of bits, a bitstream) from each NAND array of the memory system (e.g., each LUN) and may determine a total power usage for the memory system (e.g., the controller may sum or otherwise calculate power usage information for each LUN). However, some power management operations may only support (e.g., account for) specific quantities of LUNs (e.g., two, four, eight, or sixteen LUNs), which may render such power management operations ineffective or otherwise create compatibility challenges for memory systems that include other quantities of LUNs (e.g., three LUNs, five LUNs, and so forth). Additionally, or alternatively, such power management operations may not support communication of power usage information for ASICs, which may consume more power than NAND arrays. For example, a quantity of bits configured for communicating power usage for a NAND array may be insufficient for communicating power usage for an ASIC (or vice versa).

In accordance with examples as described herein, a memory system may perform a power management operation that accounts for any quantity of LUNs and, in turn, for example, any combination of ASICs and NAND arrays. Additionally, or alternatively, the power management operation may include multiple LUNs (e.g., multiple token ring instances) assigned to a single component, such as a single ASIC, which may increase a quantity of bits for communicating a power usage of the single ASIC. Accordingly, an ASIC included in a memory system may utilize more bits (e.g., twice as many bits) for communicating power usage information if compared to a NAND array. As part of the power management operation, an ASIC may transmit, to a controller, a first set of bits indicating a power usage of the ASIC, a first subset of the set of bits (e.g., six bits) transmitted during a first instance of a token ring and a second subset of the set of bits (e.g., six bits) transmitted during a second instance of the token ring. Additionally, or alternatively, a NAND array may transmit, to the controller, a second set of bits (e.g., six bits) indicating a power usage of the NAND array, the second set of bits transmitted during a third instance of the token ring.

Features of the disclosure are initially described in the context of a system with reference to FIG. 1. Features of the disclosure are described in the context of a token ring configuration and a process flow with reference to FIGS. 2 and 3. These and other features of the disclosure are further illustrated by and described in the context of an apparatus diagram and flowchart that relate to power management associated with memory and a controller with reference to FIGS. 4 and 5.

FIG. 1 illustrates an example of a system 100 that supports power management associated with memory and a controller in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations-which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support power management associated with memory and a controller. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The memory system 110 may include one or more application specific integrated circuits (ASICs), which may be configured to perform specific applications or tasks for the memory system 110. For example, an ASIC may interface with (e.g., communicate with) or otherwise manage communications (e.g., manage data) for one or more memory devices 130 of the memory system (e.g., one or more not-and (NAND) memory devices 130). In some cases, various components of a memory system 110 (e.g., memory devices 130, ASICs) may be assigned respective logical unit numbers (LUNs). A LUN may include or be an identifier for a logical unit of memory within a memory system 110 (e.g., a plane 165, a block 170, a virtual block 180, a die 160). Additionally, or alternatively, a LUN may include or be an identifier for an ASIC.

In some cases, a memory system 110 may perform a power management operation (e.g., a programmable peak power management (pPPM) operation) to track power usage for a predetermined quantity of LUNs. To perform the power management operation, a controller of the memory system 110 (e.g., a memory system controller 115, a local controller 135) may receive power usage information (e.g., a quantity of bits, a bitstream) from each memory device 130 (e.g., each NAND array) of the memory system (e.g., each LUN) and may determine a total power usage for the memory system 110 (e.g., the memory system controller 115 may sum power usage information for each LUN). However, some power management operations may only support (e.g., account for) specific quantities of LUNs (e.g., two, four, eight, or sixteen LUNs), which may render such power management operations ineffective or otherwise create compatibility challenges for memory systems 110 that include other quantities of LUNs (e.g., three LUNs, five LUNs, and so forth). Additionally, or alternatively, such power management operations may not support communication of power usage information for ASICs, which may consume more power than memory devices 130 (e.g., NAND arrays). For example, the quantity of bits configured for communicating power usage for a memory device 130 (e.g., NAND array) may be insufficient for communicating power usage for an ASIC.

In accordance with examples as described herein, a memory system 110 may perform a power management operation that accounts for any quantity of LUNs (e.g., any combination of ASICs and memory devices 130). Additionally, or alternatively, the power management operation may include multiple LUNs (e.g., multiple token ring instances) assigned to a single ASIC, which may increase a quantity of bits for communicating a power usage of the single ASIC. Accordingly, an ASIC included in a memory system 110 may utilize more bits, such as twice as many bits, for communicating power usage information if compared to a memory device 130. As part of the power management operation, an ASIC may transmit, to a controller, a first set of bits indicating a power usage of the ASIC, a first subset of the set of bits (e.g., six bits) transmitted during a first ASIC instance of a token ring and a second subset of the set of bits (e.g., six bits) transmitted during a second ASIC instance of the token ring. Additionally, or alternatively, a memory device 130 may transmit, to the controller, a second set of bits (e.g., six bits) indicating a power usage of the memory device 130, the second set of bits transmitted during a memory device 130 instance (e.g., a NAND instance) of the token ring.

Figure 2:
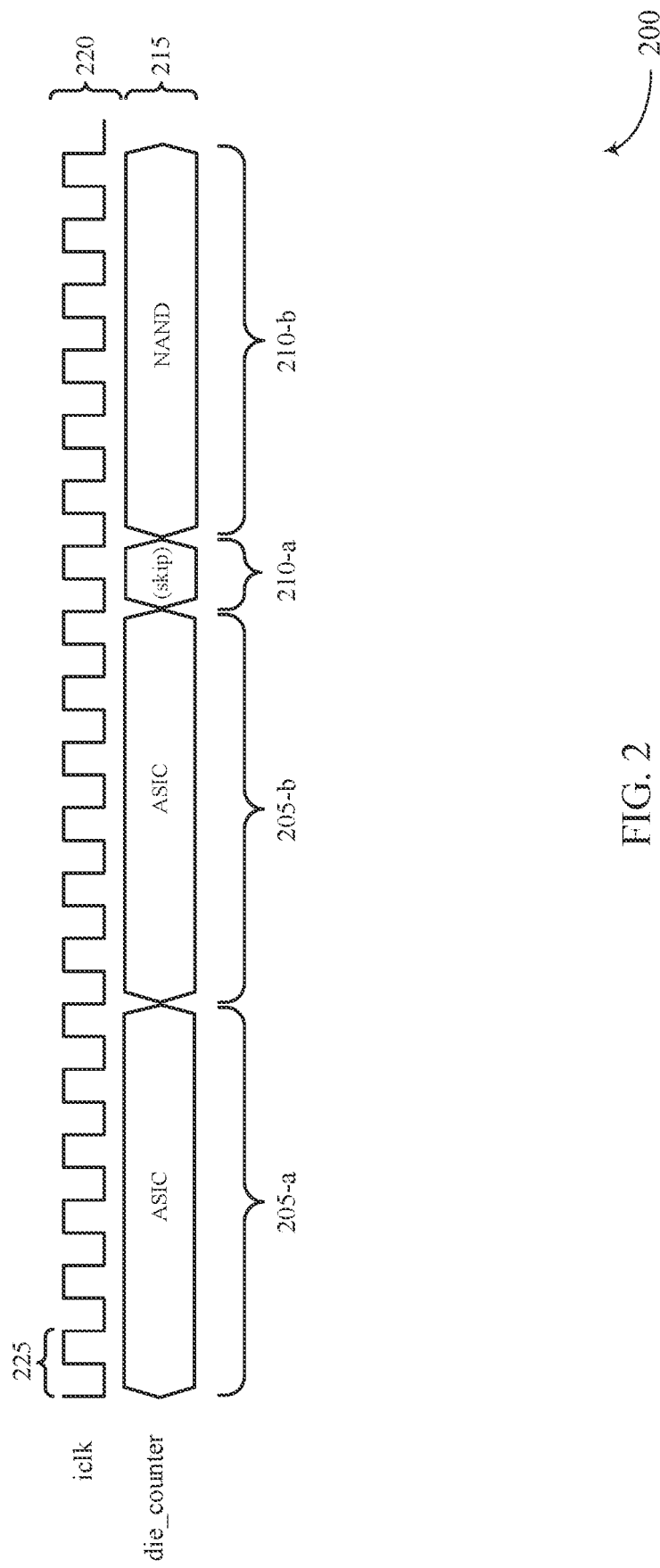
FIG. 2 illustrates an example of a token ring configuration that supports power management associated with memory and a controller in accordance with examples as disclosed herein.

FIG. 2 illustrates an example of a token ring configuration 200 that supports power management associated with memory and a controller in accordance with examples as disclosed herein. The token ring configuration may be implemented by one or more aspects of the system 100, as described with reference to FIG. 1. For example, the token ring configuration 200 may be implemented by a memory system 110, or any component of the memory system 110, such as the memory system controller 115 or a local controller 135. The token ring configuration 200 may include a clock signal 220 (e.g., iclk) and a die counter 215 (e.g., die_counter), among other information. Additionally, or alternatively, the token ring configuration 200 may include one or more ASIC instances 205 and one or more NAND instances 210, among other information. As described herein, the token ring configuration 200 may enable a memory system 110 to track (e.g., report, communicate) power usage (e.g., current flow, energy usage) for each ASIC and each NAND array (e.g., each memory device 130) included in the memory system 110.

A memory system 110 may utilize or otherwise implement a token ring (e.g., a token ring procedure) for performing power management operations (e.g., pPPM operations). As described herein, the phrase "token ring" may refer to a communication protocol for various components of a memory system 110 in which priority for communicating is shifted (e.g., passed) among the various components according to the protocol (e.g., passing of the token). For example, a first component of the memory system 110 (e.g., an ASIC) may transmit an indication to a second component of the memory system 110 (e.g., a NAND array) indicating that the first component has completed communications and that the second component may begin communications (e.g., indicating that the priority has been given to the second component, indicating that the token has been passed to the second component). Additionally, or alternatively, each component may communicate according to the clock signal 220. For example, a NAND array may be configured to communicate for a duration (e.g., six clock cycles 225).

Each clock cycle 225 may be utilized for communicating a single bit of information. For example, a NAND array may hold a token for six clock cycles 225. Accordingly, the NAND array may transmit six bits during the six clock cycles 225. As described herein, a clock cycle 225 may refer to a duration from a first falling edge of a waveform (e.g., the clock signal 220) to a second (e.g., subsequent) falling edge of the waveform. Additionally, or alternatively, a clock cycle 225 may refer to a duration from a first rising edge of a waveform to a second (e.g., subsequent) rising edge of the waveform. In some cases, a component of a memory system 110 may transmit power usage information (e.g., current flow information) to a controller of the memory system 110 during an ASIC instance 205 or a NAND instance 210, which may each occur over a duration of clock cycles 225.

In some cases, a memory system 110 may perform a power management operation to track (e.g., store) power usage for a predetermined quantity of LUNs (e.g., NAND arrays). To perform the power management operation, a controller of the memory system 110 may receive power usage information (e.g., a quantity of bits, a bitstream) from each NAND array of the memory system 110 (e.g., each LUN) and may determine a total power usage for the memory system 110 (e.g., the controller may sum power usage information for each LUN). However, some power management operations may only support (e.g., account for) specific quantities of LUNs (e.g., two, four, eight, or sixteen LUNs), which may render such power management operations ineffective or otherwise create compatibility challenges for memory systems 110 that include other quantities of LUNs (e.g., three LUNs, five LUNs, and so forth). Additionally, or alternatively, such power management operations may not support communication of power usage information for ASICs, which may consume more power than NAND arrays. For example, a quantity of bits configured for communicating power usage for a NAND array may be insufficient for communicating power usage for an ASIC.

In accordance with examples as described herein, a memory system 110 may perform a power management operation that accounts for any quantity of LUNs (e.g., any combination of ASICs and NAND arrays). For example, the memory system 110 may perform a power management operation according to the token ring configuration 200, which may account for one ASIC and two NAND arrays (e.g., two ASIC instances 205 are assigned to a single ASIC). Although one illustrative example, as described with reference to the token ring configuration 200 is related to a memory system 110 that includes two NAND arrays and one ASIC, other combinations of NAND arrays and ASICs may also be used. In some cases, assigning both the ASIC instance 205-*a* and the ASIC instance 205-*b* to a single ASIC may enable the single ASIC to communicate a higher power usage than a NAND array. For example a NAND array may communicate power usage information during the NAND instance 210-*b*, which may include six bits. In some cases, a portion (e.g., subset) of the first set of bits (e.g., a portion of a set of 12 bits) may be utilized for indicating the power usage for the ASIC. For example, the ASIC may transmit, to a controller of the memory system 110, a portion of the first set of bits (e.g., 7 bits, 8 bits, or any other portion of the first set of bits).

In some cases, a first quantity of bits may be utilized for communicating power information (e.g., 5 bits) and a second quantity of bits (e.g., 1 bit) may be utilized for communicating whether the power information is valid or invalid. In some cases, the first quantity of bits for communicating power information may be referred to as a power token and the second quantity of bits for communicating whether the power token is valid may be referred to as a high current (HC) reservation. As an illustrative example, a NAND array may transmit six bits to a controller (e.g., during six clock cycles 225, during the NAND instance 210-*b*). The first bit of the six bits may be the HC reservation bit and the subsequent five bits may be the power token. In some cases, the first bit of the six bits may be utilized to determine if the subsequent five bits are valid or invalid. For example, if the first bit indicates a first logic state (e.g., a logic 0), a controller of the memory system 110 may determine that the subsequent five bits are valid and the power usage may be communicated to the controller (e.g., in response to the power token indicating the first logic state). If the first bit indicates a second logic state (e.g., a logic 1), a controller of the memory system 110 may determine that the subsequent five bits are invalid and the communication of the power token is skipped or a previous power token is used. For example, a power usage associated with the NAND instance 210-*a* may not be communicated to a controller of the memory system 110 if an HC reservation bit indicates a logic state of 1.

Figure 3:
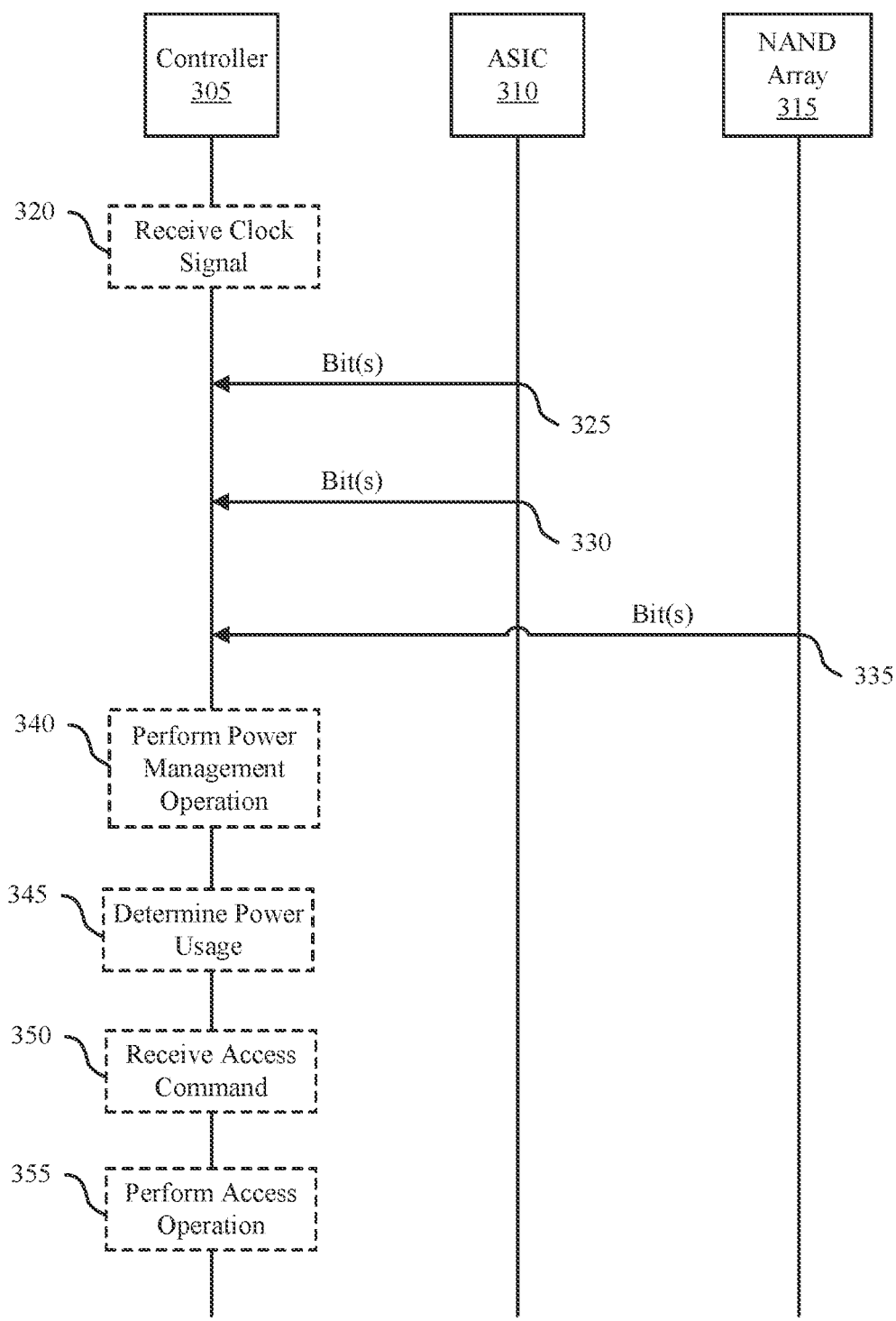
FIG. 3 illustrates an example of a process flow that supports power management associated with memory and a controller in accordance with examples as disclosed herein.

FIG. 3 illustrates an example of a process flow 300 that supports power management associated with memory and a controller in accordance with examples as disclosed herein. In some cases, one or more aspects of the process flow 300 may be implemented by one or more aspects of the system 100, as described with reference to FIG. 1. For example, a memory system 110, a memory system controller 115, a memory device 130, or a local controller 135, as described with reference to FIG. 1, may implement one or more aspects of the process flow 300. Additionally, or alternatively, one or more aspects of the token ring configuration 200, as described with reference to FIG. 2, may be implemented the process flow 300. Additionally, or alternatively, a controller 305, an ASIC 310, or a NAND array 315 may implement one or more aspects of the process flow 300.

Aspects of the process flow 300 may be implemented by a controller (e.g., the controller 305), among other components. Additionally, or alternatively, aspects of the process flow 300 may be implemented as instructions stored in memory (e.g., firmware stored in a memory coupled with the controller 305). For example, the instructions, if executed by a controller (e.g., the memory system controller 115, the controller 305), may cause the controller to perform the operations of the process flow 300. In the following description of the process flow 300, the operations may occur in a different order than the order shown, or the operations may be performed at different times. Some operations may also be left out of process flow 300, or other operations may be added to process flow 300.

At 320, a clock signal (e.g., iclk) may be received. For example, the controller 305 may receive the clock signal. In some cases, the clock signal may be received from a component of the memory system or from a component external to the memory system. In some other cases, the controller 305 may generate the clock signal. In some cases, the clock signal may indicate a quantity of clock signals. In some cases, the first duration may include four or more clock cycles, the second duration may include four or more clock cycles, and the third duration may include four or more clock cycles.

At 325, a first subset of a first set of bits may be received. For example, the controller 305 may receive, from the ASIC 310, during a first duration, a first subset of a first set of bits. The first set of bits may indicate a power usage value for the ASIC 310 (e.g., a first integrated circuit of a memory system). In some cases, the first duration may include a quantity of clock cycles. The quantity of clock cycles may be based on the quantity of bits in the first subset of the first set of bits. For example, one cycle of the clock signal may be used to signal one bit. Accordingly, there may be a one to one relationship between the quantity of clock cycles and the quantity of bits in the first subset of the first set of bits. In some cases, the first subset of the first set of bits may include four or more bits. In some cases, a first bit of the first subset of bits may indicate whether the subsequent bits of the first subset are valid. In some cases, a duration of the first duration is based on a first bit of the first subset indicating whether subsequent bits of the first subset are valid. For example, if the first bit of the first subset indicates that subsequent bits of the first subset are invalid, the first duration may be shorter (e.g., one clock cycle) if compared to the first duration (e.g., six bits) if the first bit of the first subset indicates that subsequent bits of the first subset are valid.

At 330, a second subset of the first set of bits may be received. For example, the controller 305 may receiver, during a second duration, from the ASIC 310, the second subset of the first set of bits. In some cases, a quantity of bits in the first subset and a quantity of bits in the second subset may be based on a power usage capability of the ASIC 310. For example, the quantity of bits may scale (e.g., linearly) with power usage. That is, relatively more bits may be used to communicate relatively high power usages if compared to relatively low power usages. In some cases, the second duration may be subsequent to the first duration. In some cases, the second subset of the first set of bits may include four or more bits. In some cases, a first bit of the second subset of bits may indicate whether subsequent bits of the second subset are valid. In some cases, the first set of bits may indicate a total power usage for a quantity of operations performed by the ASIC 310.

At 335, a second set of bits may be received. The second set of bits may indicate a power usage value for the NAND array 315. For example, the controller 305 may receive, during the third duration, from the NAND array 315, the second set of bits indicating the power usage value for the NAND array 315 (e.g., a first memory array of a memory system). In some cases, a quantity of bits in the second set of bits may be based on the power usage capability of the ASIC 310. In some other cases, a quantity of bits in the second set of bits may be based on a power usage capability of the NAND array 315. For example, the quantity of bits may scale (e.g., linearly) with power usage. That is, relatively more bits may be used to communicate relatively high power usages if compared to relatively low power usages. In some cases, the third duration may be subsequent to the second duration. In some cases, the second set of bits may include four or more bits. In some cases, a first bit of the second set of bits may indicate whether subsequent bits of the second set of bits are valid.

At 340, a power management operation may be performed. The power management operation may be for determining whether a total power usage value for a memory system satisfied a threshold (e.g., a threshold power usage). For example, the controller 305 may perform the power management operation to determine whether the total power usage value for the memory system satisfies the threshold. In some cases, the total power usage may include a power usage of the ASIC 310, a power usage of the NAND array 315, and power usages for any other components of the memory system, such as any quantity of other ASICs 310 and any quantity of other NAND arrays 315. If the total power usage value for the memory system satisfies the threshold, the memory system may refrain from executing commands or otherwise performing operations (e.g., performing access operations, performing other operations) for a duration (e.g., until the total power usage does not satisfy the threshold). If the total power usage value for the memory system fails to satisfy the threshold, the memory system may continue operations (e.g., as scheduled).

At 345, a power usage value (e.g., a total power usage value) for the memory system may be determined. For example, the controller 305 may determine the power usage value for the memory system. In some cases, determining the power usage value for the memory system may be based on respective power usage values for any quantity of ASICs 310 and any quantity of NAND arrays 315 (e.g., any quantity of memory arrays included in the memory system). For example, a power usage calculation or measurement may include (e.g., may be a summation of) respective power usage values for each component of the memory system (e.g., the ASIC 310, the NAND array 315). Additionally, or alternatively, the power usage value may include power usage for any other components of the memory system. For example, the memory system may include one or more other types of memory (e.g., other than NAND arrays 315), which may be included in the power usage of the memory system. In some cases, determining the total power usage value for the memory system is based on whether the subsequent bits of the first subset are valid, whether the subsequent bits of the second subset are valid, and whether the subsequent bits of the second set of bits are valid. For example, if subsequent bits of a subset are invalid the controller 305 may not include a power usage for the respective subcomponent in a total power usage determination (e.g., calculation).

At 350, a command to perform an access operation (e.g., at the NAND array 315) may be received. For example, the controller 350 may receive the command to perform the access operation. The command may be received from any component of the memory system or may be received from an external device, such as a host device or a host system 105, as described with reference to FIG. 1. For example, a host device may transmit a read command to the controller 305 and the controller 305 may perform the read command directly in response to receiving the read command.

At 355, an access operation may be performed. For example, the controller 305 may perform an access operation. In some cases, the access operation may be performed directly in response to receiving the access command. The access operation may be a read operation, a write operation, or any other access operation. For example, performing the access operation may include reading one or more memory cells of the NAND array 315. For example, the NAND array 315 may transmit information to the controller 305 for the access operation (e.g., the read operation).

As described herein, the memory system may include any quantity of ASICs 310 and any quantity of NAND arrays 315. Although the process flow 300 shows the ASIC 310 and the NAND array 315, additional ASICs 310 and additional NAND arrays 315 may be included. For example, a third set of bits may be received during a fourth duration. The fourth duration may be subsequent to the third duration. The third set of bits may indicate a power usage value for a memory array of the memory system (e.g., a NAND array 315 that is not shown). In some cases, a quantity of bits in the third set of bits may be based on the power usage capability of the ASIC 310. Additionally, or alternatively, a first subset of a fourth set of bits may be received during a fifth duration (e.g., by the controller 305). The fifth duration may be subsequent to the fourth duration or prior to the fourth duration. The fourth set of bits may indicate a power usage value for an integrated circuit of the memory system (e.g., an ASIC 310 that is not shown). Additionally, or alternatively, a second subset of the fourth set of bits may be received during a sixth duration, the sixth duration subsequent to the fifth duration.

Figure 4:
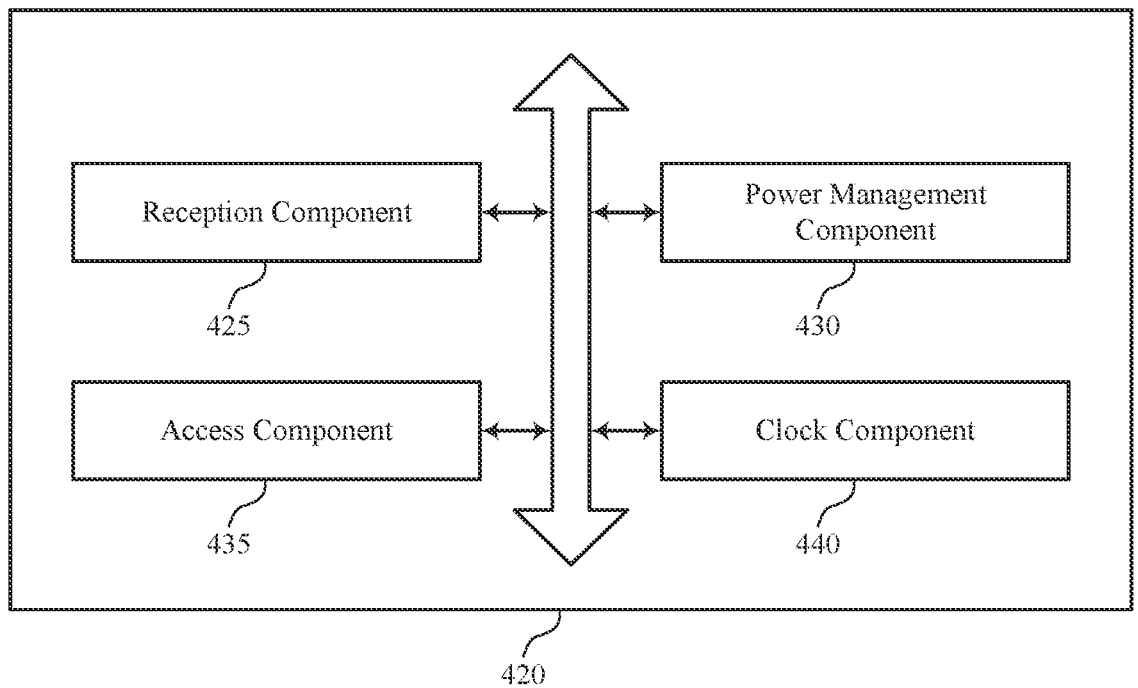
FIG. 4 illustrates a block diagram of a memory system that supports power management associated with memory and a controller in accordance with examples as disclosed herein.

FIG. 4 illustrates a block diagram 400 of a memory system 420 that supports power management associated with memory and a controller in accordance with examples as disclosed herein. The memory system 420 may be an example of aspects of a memory system as described with reference to FIGS. 1 through 3. The memory system 420, or various components thereof, may be an example of means for performing various aspects of power management associated with memory and a controller as described herein. For example, the memory system 420 may include a reception component 425, a power management component 430, an access component 435, a clock component 440, or any combination thereof. Each of these components may communicate, directly or indirectly, with one another (e.g., via one or more buses).

The reception component 425 may be configured as or otherwise support a means for receiving, during a first duration, a first subset of a first set of bits, the first set of bits indicating a power usage value for a first integrated circuit of a memory system. In some examples, the reception component 425 may be configured as or otherwise support a means for receiving, during a second duration, a second subset of the first set of bits, where a quantity of bits in the first subset and a quantity of bits in the second subset are based at least in part on a power usage capability of the first integrated circuit. In some examples, the reception component 425 may be configured as or otherwise support a means for receiving, during a third duration, a second set of bits indicating a power usage value for a first memory array of the memory system, where a quantity of bits in the second set of bits is based at least in part on the power usage capability of the first integrated circuit. The power management component 430 may be configured as or otherwise support a means for performing a power management operation to determine whether a total power usage value for the memory system satisfies a threshold, the total power usage value including the power usage value for the first integrated circuit of the memory system and the power usage value for the first memory array of the memory system.

In some examples, the reception component 425 may be configured as or otherwise support a means for receiving a command to perform an access operation on one or more memory cells of the first memory array. In some examples, the access component 435 may be configured as or otherwise support a means for performing the access operation based at least in part on the total power usage value for the memory system failing to satisfy the threshold and on receiving the command.

In some examples, to support performing the power management operation, the power management component 430 may be configured as or otherwise support a means for determining the total power usage value for the memory system based at least in part on respective power usage values for any quantity of integrated circuits of the memory system and any quantity of memory arrays of the memory system.

In some examples, the clock component 440 may be configured as or otherwise support a means for receiving a clock signal indicating a quantity of clock cycles, where the first duration includes four or more clock cycles, the second duration includes four or more clock cycles, and the third duration includes four or more clock cycles.

In some examples, the first duration includes a quantity of clock cycles, the quantity of clock cycles based at least in part on the quantity of bits in the first subset of the first set of bits.

In some examples, the second duration is subsequent to the first duration and the third duration is subsequent to the second duration.

In some examples, the first subset of the first set of bits includes four or more bits. In some examples, the second subset of the first set of bits includes four or more bits. In some examples, the second set of bits includes four or more bits.

In some examples, a first bit of the first subset indicates whether subsequent bits of the first subset are valid. In some examples, a first bit of the second subset indicates whether subsequent bits of the second subset are valid. In some examples, a first bit of the second set of bits indicates whether subsequent bits of the second set of bits are valid. In some examples, determining the total power usage value for the memory system is based at least in part on whether the subsequent bits of the first subset are valid, whether the subsequent bits of the second subset are valid, and whether the subsequent bits of the second set of bits are valid.

In some examples, a duration of the first duration is based at least in part on a first bit of the first subset indicating whether subsequent bits of the first subset are valid.

In some examples, the reception component 425 may be configured as or otherwise support a means for receiving, during a fourth duration, a third set of bits indicating a power usage value for a second memory array of the memory system, where a quantity of bits in the third set of bits is based at least in part on the power usage capability of the first integrated circuit.

In some examples, the reception component 425 may be configured as or otherwise support a means for receiving, during a fifth duration, a first subset of a fourth set of bits, the fourth set of bits indicating a power usage value for a second integrated circuit of the memory system. In some examples, the reception component 425 may be configured as or otherwise support a means for receiving, during a sixth duration, a second subset of the fourth set of bits.

In some examples, the first set of bits indicates a total power usage for a quantity of operations performed by the first integrated circuit of the memory system.

Figure 5:
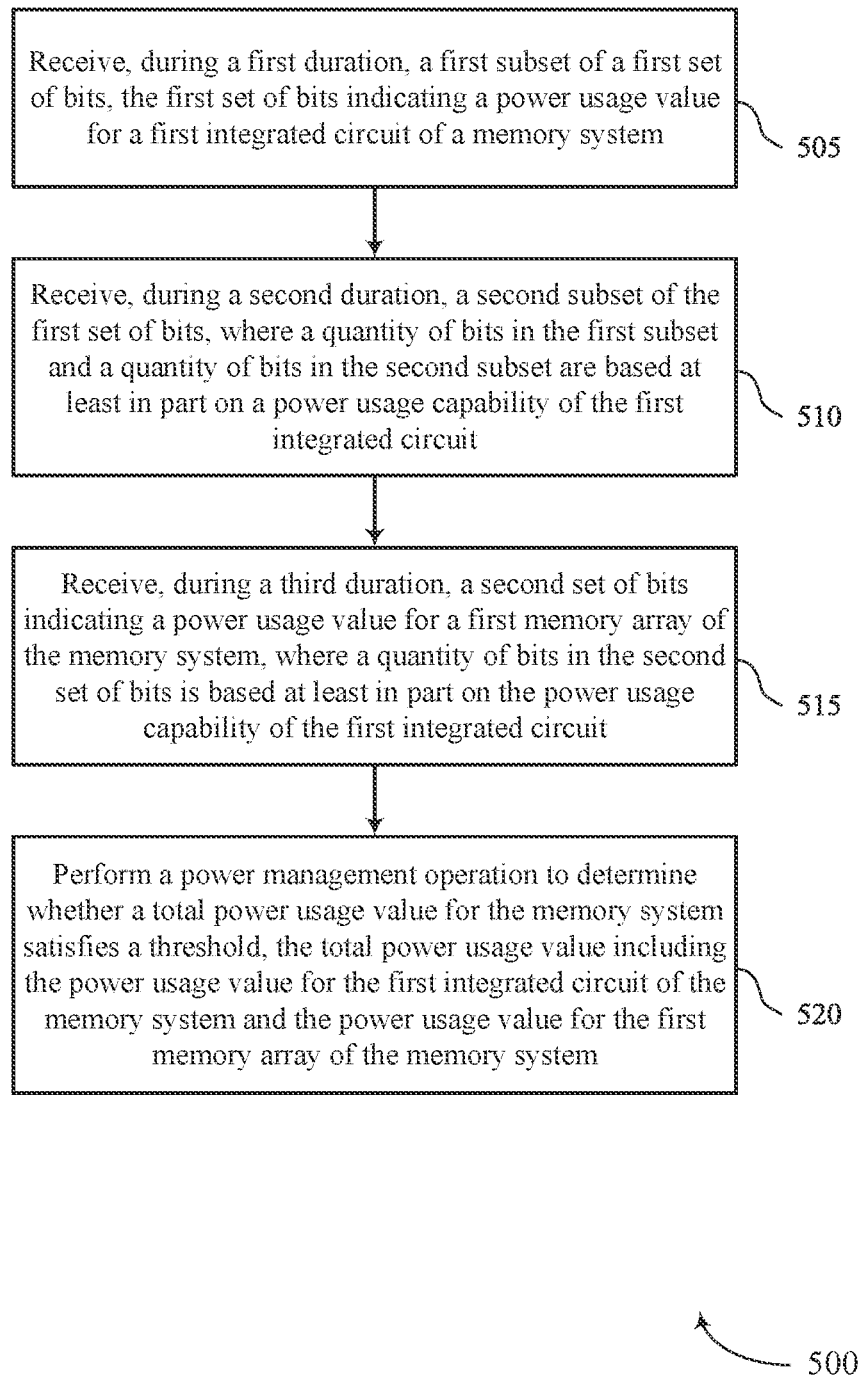
FIG. 5 illustrates a flowchart showing a method or methods that support power management associated with memory and a controller in accordance with examples as disclosed herein.

FIG. 5 illustrates a flowchart showing a method 500 that supports power management associated with memory and a controller in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include receiving, during a first duration, a first subset of a first set of bits, the first set of bits indicating a power usage value for a first integrated circuit of a memory system. The operations of 505 may be performed in accordance with examples as disclosed herein. In some examples, aspects of the operations of 505 may be performed by a reception component 425 as described with reference to FIG. 4.

At 510, the method may include receiving, during a second duration, a second subset of the first set of bits, where a quantity of bits in the first subset and a quantity of bits in the second subset are based at least in part on a power usage capability of the first integrated circuit. The operations of 510 may be performed in accordance with examples as disclosed herein. In some examples, aspects of the operations of 510 may be performed by a reception component 425 as described with reference to FIG. 4.

At 515, the method may include receiving, during a third duration, a second set of bits indicating a power usage value for a first memory array of the memory system, where a quantity of bits in the second set of bits is based at least in part on the power usage capability of the first integrated circuit. The operations of 515 may be performed in accordance with examples as disclosed herein. In some examples, aspects of the operations of 515 may be performed by a reception component 425 as described with reference to FIG. 4.

At 520, the method may include performing a power management operation to determine whether a total power usage value for the memory system satisfies a threshold, the total power usage value including the power usage value for the first integrated circuit of the memory system and the power usage value for the first memory array of the memory system. The operations of 520 may be performed in accordance with examples as disclosed herein. In some examples, aspects of the operations of 520 may be performed by a power management component 430 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, during a first duration, a first subset of a first set of bits, the first set of bits indicating a power usage value for a first integrated circuit of a memory system; receiving, during a second duration, a second subset of the first set of bits, where a quantity of bits in the first subset and a quantity of bits in the second subset are based at least in part on a power usage capability of the first integrated circuit; receiving, during a third duration, a second set of bits indicating a power usage value for a first memory array of the memory system, where a quantity of bits in the second set of bits is based at least in part on the power usage capability of the first integrated circuit; and performing a power management operation to determine whether a total power usage value for the memory system satisfies a threshold, the total power usage value including the power usage value for the first integrated circuit of the memory system and the power usage value for the first memory array of the memory system.

Aspect 2: The method, apparatus, or non-transitory computer-readable medium of aspect 1, further including operations, features, circuitry, logic, means, or instructions, or any combination thereof for receiving a command to perform an access operation on one or more memory cells of the first memory array and performing the access operation based at least in part on the total power usage value for the memory system failing to satisfy the threshold and on receiving the command.

Aspect 3: The method, apparatus, or non-transitory computer-readable medium of any of aspects 1 through 2, where performing the power management operation further includes operations, features, circuitry, logic, means, or instructions, or any combination thereof for determining the total power usage value for the memory system based at least in part on respective power usage values for any quantity of integrated circuits of the memory system and any quantity of memory arrays of the memory system.

Aspect 4: The method, apparatus, or non-transitory computer-readable medium of any of aspects 1 through 3, further including operations, features, circuitry, logic, means, or instructions, or any combination thereof for receiving a clock signal indicating a quantity of clock cycles, where the first duration includes four or more clock cycles, the second duration includes four or more clock cycles, and the third duration includes four or more clock cycles.

Aspect 5: The method, apparatus, or non-transitory computer-readable medium of aspect 4, where the first duration includes a quantity of clock cycles, the quantity of clock cycles based at least in part on the quantity of bits in the first subset of the first set of bits.

Aspect 6: The method, apparatus, or non-transitory computer-readable medium of any of aspects 1 through 5, where the second duration is subsequent to the first duration and the third duration is subsequent to the second duration.

Aspect 7: The method, apparatus, or non-transitory computer-readable medium of any of aspects 1 through 6, where the first subset of the first set of bits includes four or more bits; the second subset of the first set of bits includes four or more bits; and the second set of bits includes four or more bits.

Aspect 8: The method, apparatus, or non-transitory computer-readable medium of any of aspects 1 through 7, where a first bit of the first subset indicates whether subsequent bits of the first subset are valid; a first bit of the second subset indicates whether subsequent bits of the second subset are valid; a first bit of the second set of bits indicates whether subsequent bits of the second set of bits are valid; and determining the total power usage value for the memory system is based at least in part on whether the subsequent bits of the first subset are valid, whether the subsequent bits of the second subset are valid, and whether the subsequent bits of the second set of bits are valid.

Aspect 9: The method, apparatus, or non-transitory computer-readable medium of any of aspects 1 through 8, where a duration of the first duration is based at least in part on a first bit of the first subset indicating whether subsequent bits of the first subset are valid.

Aspect 10: The method, apparatus, or non-transitory computer-readable medium of any of aspects 1 through 9, further including operations, features, circuitry, logic, means, or instructions, or any combination thereof for receiving, during a fourth duration, a third set of bits indicating a power usage value for a second memory array of the memory system, where a quantity of bits in the third set of bits is based at least in part on the power usage capability of the first integrated circuit.

Aspect 11: The method, apparatus, or non-transitory computer-readable medium of any of aspects 1 through 10, further including operations, features, circuitry, logic, means, or instructions, or any combination thereof for receiving, during a fifth duration, a first subset of a fourth set of bits, the fourth set of bits indicating a power usage value for a second integrated circuit of the memory system and receiving, during a sixth duration, a second subset of the fourth set of bits.

Aspect 12: The method, apparatus, or non-transitory computer-readable medium of any of aspects 1 through 11, where the first set of bits indicates a total power usage for a quantity of operations performed by the first integrated circuit of the memory system.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory device; and
   a controller coupled with the memory device, wherein the controller is configured to cause the apparatus to:
   receive, during a first duration, a first subset of a first set of bits, the first set of bits indicating a power usage value for a first integrated circuit of a memory system;
   receive, during a second duration, a second subset of the first set of bits, wherein a quantity of bits in the first subset and a quantity of bits in the second subset are based at least in part on a power usage capability of the first integrated circuit;
   receive, during a third duration, a second set of bits indicating a power usage value for a first memory array of the memory system, wherein a quantity of bits in the second set of bits is based at least in part on the power usage capability of the first integrated circuit; and
   perform a power management operation to determine whether a total power usage value for the memory system satisfies a threshold, the total power usage value comprising the power usage value for the first integrated circuit of the memory system and the power usage value for the first memory array of the memory system.

2. The apparatus of claim 1, wherein the controller is further configured to cause the apparatus to:
   receive a command to perform an access operation on one or more memory cells of the first memory array; and perform the access operation based at least in part on the total power usage value for the memory system failing to satisfy the threshold and on receiving the command.

3. The apparatus of claim 1, wherein performing the power management operation is further configured to cause the apparatus to:
determine the total power usage value for the memory system based at least in part on respective power usage values for any quantity of integrated circuits of the memory system and any quantity of memory arrays of the memory system.

4. The apparatus of claim 1, wherein the controller is further configured to cause the apparatus to:
receive a clock signal indicating a quantity of clock cycles, wherein the first duration comprises four or more clock cycles, the second duration comprises four or more clock cycles, and the third duration comprises four or more clock cycles.

5. The apparatus of claim 4, wherein the first duration comprises the quantity of clock cycles, the quantity of clock cycles based at least in part on the quantity of bits in the first subset of the first set of bits.

6. The apparatus of claim 1, wherein the second duration is subsequent to the first duration and the third duration is subsequent to the second duration.

7. The apparatus of claim 1, wherein:
the first subset of the first set of bits comprises four or more bits;
the second subset of the first set of bits comprises four or more bits; and
the second set of bits comprises four or more bits.

8. The apparatus of claim 1, wherein:
a first bit of the first subset indicates whether subsequent bits of the first subset are valid;
a first bit of the second subset indicates whether subsequent bits of the second subset are valid;
a first bit of the second set of bits indicates whether subsequent bits of the second set of bits are valid; and
determining the total power usage value for the memory system is based at least in part on whether the subsequent bits of the first subset are valid, whether the subsequent bits of the second subset are valid, and whether the subsequent bits of the second set of bits are valid.

9. The apparatus of claim 1, wherein a duration of the first duration is based at least in part on a first bit of the first subset indicating whether subsequent bits of the first subset are valid.

10. The apparatus of claim 1, wherein the controller is further configured to cause the apparatus to:
receive, during a fourth duration, a third set of bits indicating a power usage value for a second memory array of the memory system, wherein a quantity of bits in the third set of bits is based at least in part on the power usage capability of the first integrated circuit.

11. The apparatus of claim 1, wherein the controller is further configured to cause the apparatus to:
receive, during a fifth duration, a first subset of a fourth set of bits, the fourth set of bits indicating a power usage value for a second integrated circuit of the memory system; and
receive, during a sixth duration, a second subset of the fourth set of bits.

12. The apparatus of claim 1, wherein the first set of bits indicates a total power usage for a quantity of operations performed by the first integrated circuit of the memory system.

13. A non-transitory computer-readable medium storing code comprising instructions which, when executed by a processor of an electronic device, cause the electronic device to:
receive, during a first duration, a first subset of a first set of bits, the first set of bits indicating a power usage value for a first integrated circuit of a memory system;
receive, during a second duration, a second subset of the first set of bits, wherein a quantity of bits in the first subset and a quantity of bits in the second subset are based at least in part on a power usage capability of the first integrated circuit;
receive, during a third duration, a second set of bits indicating a power usage value for a first memory array of the memory system, wherein a quantity of bits in the second set of bits is based at least in part on the power usage capability of the first integrated circuit; and
perform a power management operation to determine whether a total power usage value for the memory system satisfies a threshold, the total power usage value comprising the power usage value for the first integrated circuit of the memory system and the power usage value for the first memory array of the memory system.

14. The non-transitory computer-readable medium of claim 13, wherein the instructions, when executed by the processor of the electronic device, further cause the electronic device to:
receive a command to perform an access operation on one or more memory cells of the first memory array; and
perform the access operation based at least in part on the total power usage value for the memory system failing to satisfy the threshold and on receiving the command.

15. The non-transitory computer-readable medium of claim 13, wherein the instructions to perform the power management operation are further executable by the processor to:
determine the total power usage value for the memory system based at least in part on respective power usage values for any quantity of integrated circuits of the memory system and any quantity of memory arrays of the memory system.

16. The non-transitory computer-readable medium of claim 13, wherein the instructions, when executed by the processor of the electronic device, further cause the electronic device to:
receive a clock signal indicating a quantity of clock cycles, wherein the first duration comprises four or more clock cycles, the second duration comprises four or more clock cycles, and the third duration comprises four or more clock cycles.

17. The non-transitory computer-readable medium of claim 16, wherein the first duration comprises the quantity of clock cycles, the quantity of clock cycles based at least in part on the quantity of bits in the first subset of the first set of bits.

18. The non-transitory computer-readable medium of claim 13, wherein the second duration is subsequent to the first duration and the third duration is subsequent to the second duration.

19. The non-transitory computer-readable medium of claim 13, wherein:
the first subset of the first set of bits comprises four or more bits;
the second subset of the first set of bits comprises four or more bits; and
the second set of bits comprises four or more bits.

20. A method, comprising:
- receiving, during a first duration, a first subset of a first set of bits, the first set of bits indicating a power usage value for a first integrated circuit of a memory system;
- receiving, during a second duration, a second subset of the first set of bits, wherein a quantity of bits in the first subset and a quantity of bits in the second subset are based at least in part on a power usage capability of the first integrated circuit;
- receiving, during a third duration, a second set of bits indicating a power usage value for a first memory array of the memory system, wherein a quantity of bits in the second set of bits is based at least in part on the power usage capability of the first integrated circuit; and
- performing a power management operation to determine whether a total power usage value for the memory system satisfies a threshold, the total power usage value comprising the power usage value for the first integrated circuit of the memory system and the power usage value for the first memory array of the memory system.

\* \* \* \* \*